(12) United States Patent
Kung et al.

(10) Patent No.: US 6,750,981 B1
(45) Date of Patent: Jun. 15, 2004

(54) METHOD AND SYSTEM FOR EXECUTING WORK DESIGNATION

(75) Inventors: Shao-Tsu Kung, Taipei (TW); Shu-Hua Tsai, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 09/335,910

(22) Filed: Jun. 18, 1999

(51) Int. Cl.7 .............. G06F 15/00; G06F 17/60; G06K 9/20
(52) U.S. Cl. .............. 358/1.15; 705/9; 382/317
(58) Field of Search ................ 358/3, 1.15, 478, 358/442, 474; 705/9, 14, 5; 382/317

(56) References Cited

U.S. PATENT DOCUMENTS 6,016,478 A * 1/2000 Zhang et al. ............... 705/9
6,334,103 B1 * 12/2001 Surace et al. .............. 704/257
6,363,352 B1 * 3/2002 Dailey et al. ............... 705/9
6,401,067 B2 * 6/2002 Lewis et al. ................ 704/275
6,480,830 B1 * 11/2002 Ford et al. .................. 705/9

* cited by examiner

Primary Examiner—Kimberly A. Williams
Assistant Examiner—Saeid Ebrahimi
(74) Attorney, Agent, or Firm—Sughrue Mion, PLLC

(57) ABSTRACT

The present invention discloses a method a system for automatic executing work designation for office automation, which divides works obtained and resolved from meetings to increase office efficiency. At first, individual issues of executed work are divided and analyzed. The individual issues are identified whether for saving or sending an information of the individual issues to executors. The information of an individual issue is sent to a file management system when need to be saved. The information of individual issues are linked with a sending system when need to be sent. When the names of the executors are recognized, e-mail addresses or fax numbers of the executors are linked, the information of the individual issues are then sent to the e-mail addresses or the fax numbers of the executors.

16 Claims, 4 Drawing Sheets

| Item | Executor | Description of Issue | Priority of Issue | | Process | | | |
|---|---|---|---|---|---|---|---|---|
| | | | Urgent | Normal | Save | E-mail | Fax | Schedule |
| 1 | | | | | | | | |
| 2 | | | | | | | | |
| 3 | | | | | | | | |
| 4 | | | | | | | | |
| 5 | | | | | | | | |

FIG.1

METHOD AND SYSTEM FOR EXECUTING WORK DESIGNATION

FIELD OF THE INVENTION

The present invention relates to a method for office automation, and more particularly, to an execution method for office automation that increases efficiency of work designation and decreases required working period.

BACKGROUND OF THE INVENTION

A computer era has come, many complicated routine works in human's daily life are performed and simplified by computers. For example, a scanner scans a document, which replaces a routine manually inputting work, and recognition software can get more than ninety-percent successful recognition of the scanned document. Additionally, Internet shortens the distance between humans because they can send a mail to each other in few seconds by e-mail systems, which may spend many days or weeks conventionally.

Furthermore, so-called computer assistant or computer secretary, also called personal digital assistant (PDA), gradually becomes a fashion and necessary product in daily life. So-called personal digital assistant contains functions such as saving personality information, management of visiting card, time management, tracing and establishing plans and activities. There is much computer software function as PDA being a computer secretary, for example, Microsoft Outlook etc. However, the aforementioned software can not satisfy a need of user's requirement sometimes, because they can not transfer a working information automatically and quickly.

Nowadays, almost everyone has to join kinds of meetings everyday to overcome problems of different issues. Those issues, for example work designation or tracing of processes, are recorded by using paper works that writing down the meeting information conventionally. Then, the information is manually input into a computer accompanied by some additional manual operations, such as saving, sending, and tracing. However, unavoidable man-made mistakes may significantly decrease totally work efficiency.

Therefore, there is a need of providing a method and a system for overcoming the disadvantages of prior art, wherein the disclosed method and system can automatically execute work designations such that the above shortcomings can be eliminated.

SUMMARY OF THE INVENTION

The object of the present invention is to provide work designation method for office automation that increases work efficiency and performs work designation efficiently and automatically.

Accordingly, the present invention discloses a method of automatically executing work designation for office automation, which divides works obtained and resolved form meetings to increase office efficiency. Individual issues of executing work are processed and analyzed by the automatic executing work designation method. The individual issues are identified whether for saving or sending to executors. The information of an individual issue is sent to a file management system while need to be saved. The information of an individual issue is linked to a sending system when an individual issue needs to be sent. When the name of the executor is recognized, the information of the individual issue is then sent to the executor through a e-mail address or a fax number.

The automatic executing work designation system disclosed in the present invention comprises an information inputting means for inputting the information of executed work, an information analyzing means for analyzing the descriptive information of issues in executed work, a first identifying means for identifying the descriptive information of issues to be saved or not, a second identifying means for identifying the descriptive information to be sent to executors or not, a file management system for saving the descriptive information of issues, and a sending system for sending the descriptive information of issues to executors.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 represents a table illustrative of a descriptive information of executed works obtained and resolved form meetings according to the present invention;

DESCRIPTION OF THE PREFERRED EMBODIMENTS

Accordingly, the present invention provides a method of automatic executing work designation for dividing works obtained and resolved from meetings to increase office efficiency. Typically, some issues must be executed in time, some issues must be saved immediately. The disclosed method can prevent work delay from man-made mistakes, and satisfy the requirements of the above issues.

Please refer to FIG. 1, which represents a table illustrative of descriptive information of executed works obtained and resolved form meetings according to the present invention. The table contents include executors, description of the issues, priority of the issues, and processes, wherein the contents can be modified to an appropriate form based on requirements. The processes consist of saving, e-mailing, faxing, and scheduling of the individual issues. As noted, any executor can only obtain the information of the assigned individual issue from an e-mail or fax system.

Figure 2:
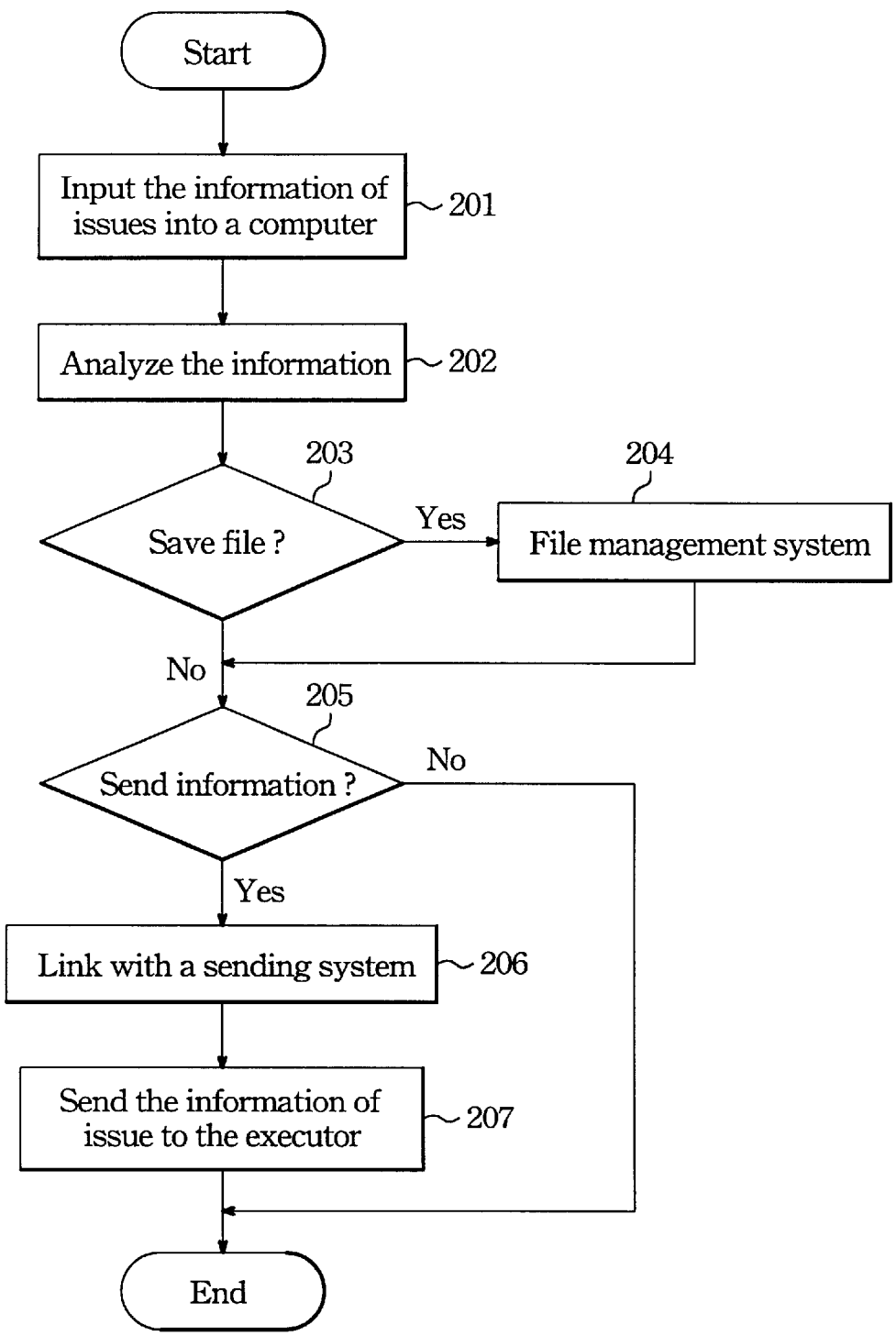
FIG. 2 represents a block diagram illustrative of a first preferred embodiment according to the present invention.

Referring to FIG. 2, which shows the first preferred embodiment of the present invention, wherein a block diagram of inputting information of the executed work into a computer directly by user is shown therein. Initially, the user writes information of executed works obtained and resolved form meetings into a table or any recordable paper. The user inputs the information of executed work into a table created previously in the computer after the meeting (step 201). The user can also input the information of executed work into the computer when meeting. The information of the executed work is analyzed line by line after inputting the information into the computer to generate a plurality of information of individual issues (step 202). The plurality of information of individual issues are then saved and recognized. The content of the column named "save" is first identified to ensure whether the information of the individual issue should be saved or not (step 203). The information of the individual issue is sent to a file management system when the information should be saved (step 204). The content of sending column is then identified to ensure whether the information of the individual issue should be sent to an executor or not (step 205). The sending column further comprises an e-mail column and a fax column. When the information of individual issue should be sent to the executor, a sending system is linked for sending the information after the content of the executor column is recognized (step 206). After the sending system obtains the required e-mail addresses or fax numbers of the executors from the recognized results, the information of the individual issue is sent to the executors automatically (step 207).

Figure 3:
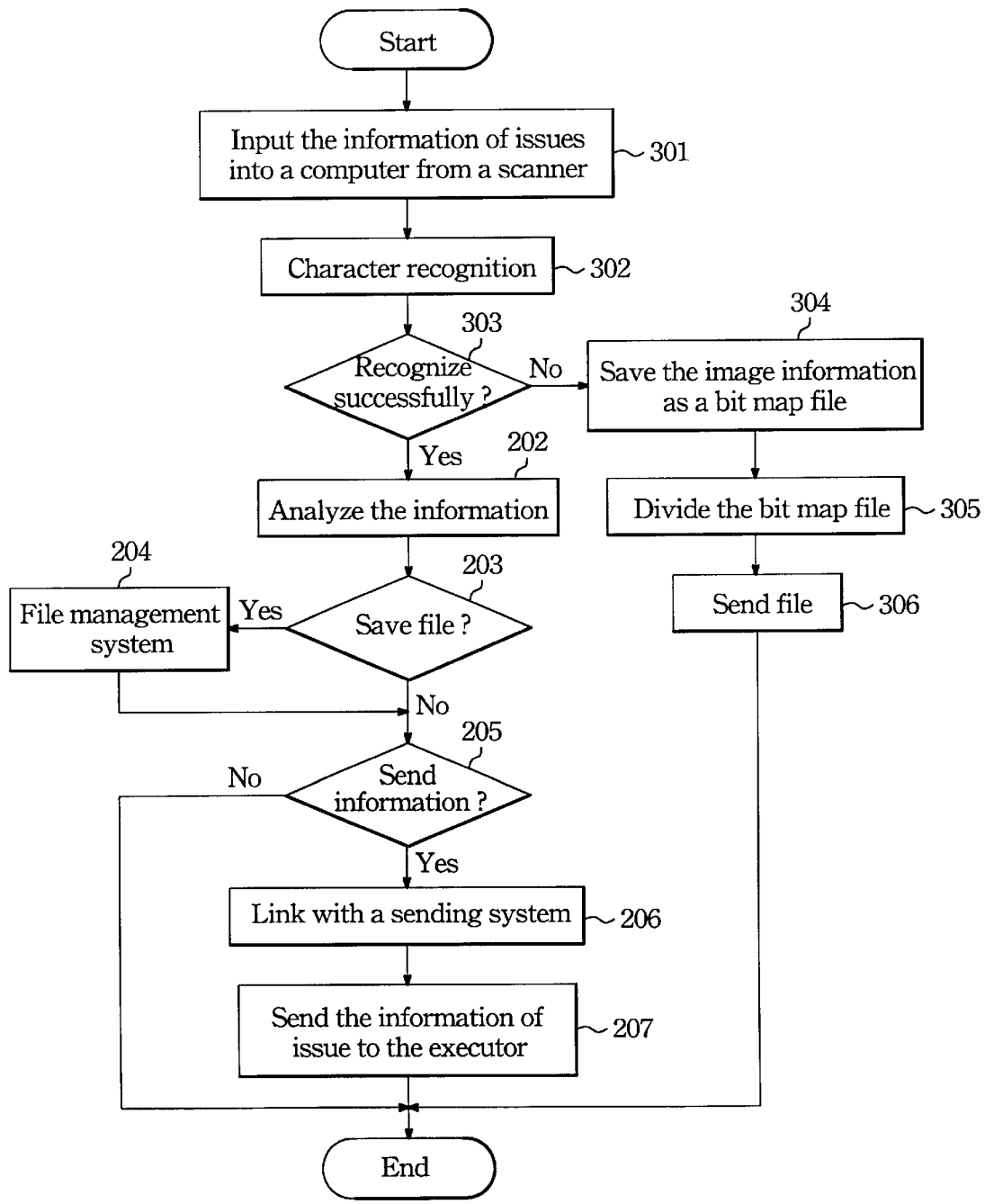
FIG. 3 represents a block diagram illustrative of using scanner to obtain an information of executed work according to the present invention.

FIG. 3 that shows the second preferred embodiment, wherein a block diagram of inputting the information of executed work by scanner is shown. Accordingly, the present invention provides an improving method for processing those executed works having amounts of information. The information of executed work is written in a table, which comprises executors, description of issues, priority of issues, and processes. The table with the information of executed work is scanned by a scanner into a computer after meeting, which generates an image information of executed work (step 301). A recognition module is then performed for recognizing the image information, wherein the recognition module is recognition software, such as Optical Character Recognition (OCR) module for recognizing the characters from the scanned image (step 302). Finally, the above image information is transferred to a text file for further processing. Step 303 identifies whether the scanned document is recognized successfully or unsuccessfully. When the scanned document is not recognized successfully, the scanned document is saved as a bitmap file with the smallest duty form of an image file (step 304). An operator divides the bitmap file by an image editor into a plurality of sub-image information according to individual issues. The operator follows manually the processes of individual issues to save the information of the individual issues, or send the information of the individual issues to executors by e-mail system or fax system, respectively.

When the scanned document is recognized successfully, the information of executed work has input into the computer. Subsequently, the step of analyzing the information of executed work is performed. The information of the executed work is analyzed line by line to generate a plurality of information of individual issues (step 202). The plurality of information of individual issues are then saved and recognized. The content of the column named "save" is first identified to ensure whether the information of the individual issue should be saved or not (step 203). The information of the individual issue is sent to a file management system when the information needs to be saved (step 204). The content of sending column is then identified to ensure whether the information of the individual issues require to be sent to executors or not (step 205). The sending column comprises an e-mail column and a fax column. When the information of individual issues need to be sent to the executors, a sending system, such as an e-mail and fax system is linked for sending the information after the content of the executor column is recognized (step 206). After the sending system obtains the e-mail addresses or fax numbers of the executors, the information of the individual issue can be sent to the executors automatically. Thus, the executed work is designated completely in a short time.

Figure 4:
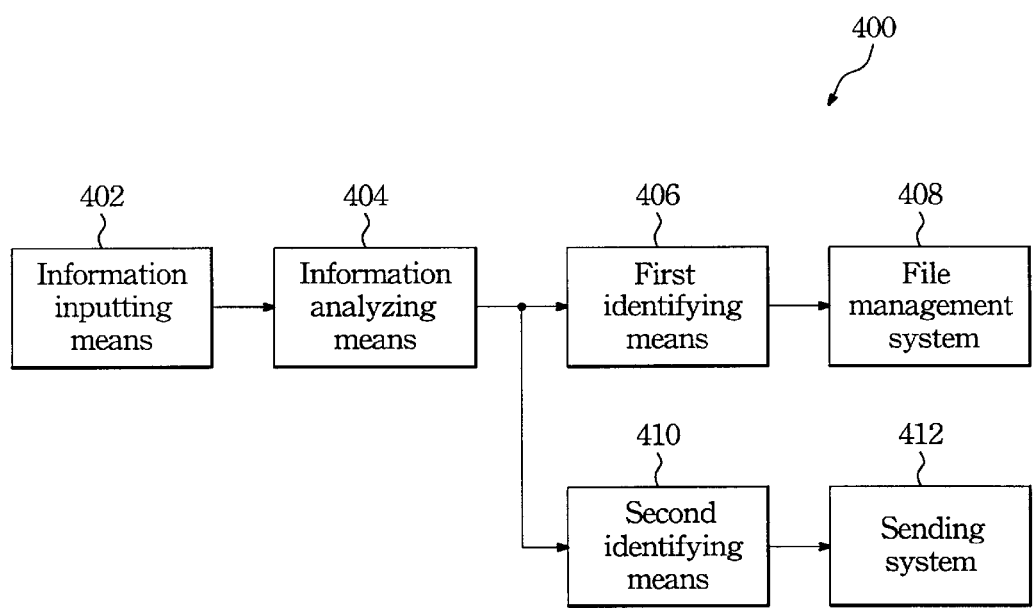
FIG. 4 represents a block diagram illustrative of automatic executing work designation system according to the present invention.

FIG. 4 shows a block diagram of an automatic executing work designation system according the present invention. The automatic executing work designations system 400 comprises an information inputting means 402 for inputting the information of executed work into a computer. The information inputting means 402 comprises a computer keyboard, a scanner, and a character recognition module. The information inputting means 402 can further comprises a file management system coupling to the character recognition module for saving the image information recognized unsuccessfully, and an image editor coupling to the file management system for dividing the image information to individual images according to individual issues. An information analyzing means 404 couples to the information inputting means 402 for analyzing the descriptive information of individual issues line by line and then column by column. A first identifying means 406 couples to the information analyzing means 404 for identifying whether the descriptive information of individual issues noted to be saved or not. When the information of individual issues need to be saved, a file management system 408 is linked for saving. A second identifying means 410 couples to the information analyzing means 404 for identifying whether the descriptive information of individual issues need to be sent to executors or not. When the information of individual issues need to be sent to the executors, a sending system 412 is linked for sending the descriptive information of issues to executors. The sending system 412 comprises a first searching means for searching e-mail addresses to the executors and an e-mail system coupling to the first searching means for sending the information to the e-mail addresses of the executors automatically. The sending system 412 further comprises a second searching means for searching fax numbers of the executors and a fax system coupling to the second searching means for sending the information to the fax numbers of the executors automatically.

Accordingly, the present invention discloses a method and a system for automatic executing work designation. Individual issues of executed work are divided and analyzed subsequently in the invention. The individual issues are identified whether saving or sending an information of the individual issue to an executor respectively. A file management system is linked when need to save files. A sending system is linked when need to be send an information. When the name of the executor is recognized, an e-mail address or a fax number of the executor is linked, the information of the individual issue is then send to the e-mail address or the fax machine of the executor.

As is understood by a person that skilled in the art, the foregoing preferred embodiment of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

While the preferred embodiment of the invention has been illustrative and described, it will be appreciated that various changes can be made therein without departing from the spirit and scope of the invention.

What is claimed is:

1. A method for executing work designation, said method comprising the steps of:
   scanning a table by a scanner coupled to a computer to obtain an image information of an executed work;
   recognizing said image information by a character recognition module to transfer said image information to a text information, when said image information is recognized successfully;

analyzing said table line by line to generate a plurality of information of individual issues, wherein said information of said individual issues comprises contents of executor column and contents of description of issue column; and saving and dividing said image information to a plurality of sub-image information according to said individual issues by an image editor, when said image information is not recognized successfully;

sending said information to executors according to said individual issues using a sending system.

2. The method according to claim 1, wherein said step of inputting said table into a computer comprises:

creating said table into said computer; and inputting said information of said executed work by a computer keyboard into said table in said computer.

3. The method according to claim 1, wherein said step of analyzing said table comprises:

identifying contents of sending column of said individual issues, wherein said contents of said sending column comprise contents of e-mail column and contents of fax column; and linking with said sending system for sending said information of said individual issues when said information of said individual issues need to be sent.

4. The method according to claim 1, wherein said step of analyzing said table comprises:

identifying contents of a saving column of said individual issues; and linking with a file management system for saving said information of said individual issues when said information of said individual issues need to be saved.

5. The method according to claim 1, wherein said step of sending said information comprises:

recognizing contents of said executor column;

searching e-mail addresses of said executors of said individual issues; and sending said information of said individual issues to said e-mail addresses of said executors by an e-mail system.

6. The method according to claim 1, wherein said step of sending said information comprises:

recognizing contents of said executor column;

searching fax numbers of said executors of said individual issues; and sending said information of said individual issues to fax numbers of said executors by a fax system.

7. The method according to claim 6, wherein said image information is saved in a bitmap file.

8. A system for executing work designation, said system comprising:

information inputting means for inputting a table with an information of an executed work into a computer, wherein said information inputting means comprises:

a scanner coupling to said computer for scanning said table to obtain image information of said executed work; and a character recognition module coupling to said scanner for recognizing said image information to transfer said image information to text information, while said image information is recognized successfully;

information analyzing means coupling to said information inputting means for analyzing said table line by line to generate a plurality of information of individual issues, wherein said information of said individual issues comprises contents of executors column and contents of description of issue column;

a first file management system coupling to said character recognition module for saving said image information and an image editor coupling to said first file management system for dividing said image information to a plurality of sub-image information according to said individual issues, while said image information is not recognized successfully; and a sending system coupling to said information means for sending said information of said individual issues to executors.

9. The executing work designation system according to claim 8, wherein said first file management saves said image information in a bitmap file.

10. The executing work designation system according to claim 8, wherein said table is created in said computer and said information inputting means is a computer keyboard for inputting said information of said executed work into said table.

11. The executing work designation system according to claim 8, wherein said information analyzing means analyses saving column contents of individual issues.

12. The executing work designation system according to claim 8, further comprising:

first identifying means coupling to said information analyzing means for identifying contents of saving column when said information of said individual issues need to be saved; and a second file management system coupling to said first identifying means for saving said information of said individual issues.

13. The executing work designation system according to claim 8, wherein said information analyzing means analyses contents of sending column of individual issues, wherein said contents of sending column comprise contents of e-mail column and contents of fax column.

14. The executing work designation system according to claim 8, further comprising second identifying means coupling between said information analyzing means and said sending system for identifying said contents of said sending column of individual issues, and for linking with said sending system when said information of said individual issues need to be sent.

15. The executing work designation system according to claim 8, wherein said sending system comprises:

first searching means for searching e-mail addresses of said executors; and an e-mail system coupling to said first searching means for sending said information of said individual issues to said e-mail addresses of said executors.

16. The executing work designation system according to claim 8, wherein said sending system comprises:

second searching means for searching fax numbers of said executors; and a fax system coupling to said second searching means for sending said information of said individual issues to said fax numbers of said executors.

* * * * *